(12) United States Patent
Harada

(10) Patent No.: US 6,202,025 B1
(45) Date of Patent: Mar. 13, 2001

(54) VEHICLE-USE MAP DATA PROCESSING DEVICE AND METHOD

(75) Inventor: Tomoyasu Harada, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/134,432

(22) Filed: Aug. 14, 1998

(30) Foreign Application Priority Data

Aug. 21, 1997 (JP) ................................... 9-225189

(51) Int. Cl.[7] ........................................ H04B 7/26
(52) U.S. Cl. ........................ 701/208; 701/200; 340/990; 340/995
(58) Field of Search ................... 701/208, 200; 340/995, 990

(56) References Cited

U.S. PATENT DOCUMENTS

| | | | |
|---|---|---|---|
| 5,471,205 | * 11/1995 | Izawa | 340/995 |
| 6,023,655 | * 2/2000 | Nomura | 701/208 |
| 6,047,234 | * 4/2000 | Cherveny et al. | 701/200 |
| 6,061,003 | * 5/2000 | Harada | 340/995 |
| 6,075,467 | * 6/2000 | Ninagawa | 340/995 |
| 6,088,652 | * 7/2000 | Abe | 701/208 |

FOREIGN PATENT DOCUMENTS 7-262493  10/1995  (JP).

\* cited by examiner

*Primary Examiner*—William A. Cuchlinski, Jr.
*Assistant Examiner*—Olga Hernandez
(74) *Attorney, Agent, or Firm*—Finnegan, Henderson, Farabow, Garrett & Dunner, L.L.P.

(57) ABSTRACT

A map data storing section stores externally acquired map data. A data clearance processor clears map data previously acquired when available capacity is judged to be insufficient. Remaining map data is rearranged chronologically according to a map date (more recent one of an acquisition date and a last used date). Map data with an older map date is considered having a lower possibility of being reused, and thus is selected as a delete object. A delete object is initially compressed. If sufficient vacancy cannot be created only through compression, the delete object is then deleted to thereby enlarge the vacancy in the storage. As described above, map data having been acquired via data communication is automatically cleared to thereby enlarge vacancy in the storage. With this arrangement, reacquisition of the same map data is avoided.

20 Claims, 7 Drawing Sheets

VEHICLE-USE MAP DATA PROCESSING DEVICE AND METHOD

BACKGROUND OF THE INVENTION

1. Field of the Invention

The present invention generally relates to a vehicle-use map data processing device and method in which map data is externally acquired via a communication means, and in particular, to a device and method which can clear redundant map data at an appropriate timing.

2. Description of the Related Art

The use of on-vehicle map data processing devices is spreading, with the most common of these devices being a navigation device. A conventional navigation device comprises a memory medium, such as CD-ROM, for storing map data, and utilizes originally installed map data for navigation.

A new technology has been proposed and developed, in which a vehicle is connected to an information center via a communication means, and receives various useful information from the center via data communication. With this development as a background, offering map data to a vehicle via data communication is also proposed.

As shown in FIG. 1, an information center holds detailed map data for a wide area divided into a number of sectional maps. A vehicle acquires map data needed at that time from the information center. For example, a vehicle can acquire the map data of a sectional map covering the area around the present point, around the destination, or for any point designated by a user. Acquired map data (i.e., map data of maps A, B, C in FIG. 1) is held in the memory device (medium) on a vehicle side for use in navigation.

The advantage of this system lies in the fact that a vehicle need not hold large quantities of map data, and can nevertheless have access to a detailed map of a desired area. As an example, a vehicle need not store map data which the vehicle does not normally use, such as for maps around a sightseeing attraction because the vehicle can acquire map data concerning the attraction from an information center when it is actually needed.

Such a device is disclosed in, for example, Japanese Patent Laid-open No. Hei 7-262493. According to this publication, map data which a vehicle always carries is limited to that for basic maps showing main roads, and the like. The vehicle externally acquires map data of other detailed maps via communication with an external source.

Acquired map data via communication is stored in a memory device of a map data processing device. In other words, the memory device is accumulatively loaded with acquired map data. However, as the memory capacity of the memory device is limited, the quantity of map data which can be stored therein is naturally limited. Therefore, if map data kept in the memory device is not sometimes cleared to enlarge the vacancy, the stored map data overflows the memory capacity.

The easiest way of enlarging vacancy in the memory device is to delete some of the stored map data. However, deleted map data might be required later, and, in such a case, it might be necessary to externally acquire the same data again. Even more problematic, needed map data is not available for immediate use when needed because data transmission and subsequent processing must first be carried out. Moreover, extra communication costs may incur for reacquisition of map data. In light of this, reacquisition of map data is preferably avoided. However, no available conventional technology can meet this demand.

Also, with the device disclosed by the JP Laid-open No. Hei 7-262493, a user is required to designate map data to be deleted (delete object) and to then execute a clearance operation. In order to do this, the user must detect by himself which map data is stored in a memory device and which one of them is unnecessary. Such judgement may be hardly made by a user. Even if it is made, map data clearance is troublesome for a user to conduct. Also, unlike a PC user, a vehicle operator can not be expected to be familiar with file clearance operations, and it may be quite troublesome for such a user to perform a clearance operation by using a device such as is provided in a vehicle with a limited inside space, which is generally small. In this view, there is great desire for a device that can automatically and appropriately perform a data clearance operation on behalf of a user.

SUMMARY OF THE INVENTION

The present invention aims to provide a map data processing device and method for automatically and reliably clearing map data on behalf of a user. In particular, the present invention aims to provide a device which can avoid as much as possible a situation in which the same map data as that which was once cleared, needs to be acquired again so that map data is always kept available for immediate use, and communication costs are reduced.

In order to achieve the above object, a vehicle-use map data processing device of this invention predicts a possibility of reusing map data and performs map data compression for the purpose of avoiding reacquisition of map data.

(1) According to one aspect of the present invention, there is provided a vehicle-use map data processing device which utilizes map data acquired externally through a communication means, comprising: map data storing means for storing the map data acquired; selection means for judging a possibility of reusing map data stored in the map data storing means to automatically select map data with a lower possibility of being reused as a delete object; and deleting means for deleting the delete object prior to deleting other map data from the map data storing means.

A possibility of reusing map data is the possibility that respective map data may be used again later. The map data storing means stores various map data, including that which has been used only once and is quite unlikely to be used again in the future, and that which has been used often and is therefore more likely to be used again in the future. The first type of map data has a low possibility of being reused, while the latter map data has a higher possibility of being reused.

Preferably, judgement of the possibility of reusing map data factors in at least one of an acquisition date or a last used date of the map data, with map data with a recent acquisition or last used date being more likely to be used again in the future.

Also, preferably, a possibility of reusing map data is judged based on positional relationship between a predetermined judgement standard point and an area corresponding to the map data. A judgement standard point may be the user's home or another point set by a user. Preferably, map data concerning areas around the judgement standard point is excluded from delete objects as it has a higher possibility of being reused. Map data concerning areas far from the standard point may be initially selected as a delete object. In particular, if a judgement standard point is determined for every user, the map data processing device is able to make appropriate judgement so as to meet the needs of each user.

Also preferably, a possibility of reusing map data is judged based on the frequency at which map data has been used. Map data which has often been used may have a higher possibility of being reused in the future.

According to the present invention, map data with a low possibility of being reused of all map data stored in the map data storing means is selected as a delete object and deleted prior to other data, while those with a high possibility are kept in the storing means. As a result, a wasteful process, i.e., reacquisition of map data which was once acquired and deleted, is performed less often. Therefore, map data can be appropriately cleared on behalf of a user.

(2) Preferably, the vehicle-use map data processing device of the present invention further may comprise a compression means for compressing delete objects to thereby enlarge free space in the map data storing means. The deleting means deletes a delete object when the available memory for map data remains insufficient after compression of the delete object.

Specifically, as shown in FIG. 2, a delete object with a low possibility of being reused is compressed. Compressed map data cannot be used intact, but can be used after being decompressed. Compression results in reducing a memory capacity consumed to store the delete object, so that available space in the storing means is enlarged. If sufficient capacity cannot be ensured only through compression, the delete object is actually deleted. On the other hand, map data with a high possibility of being reused is kept in a non-compressed state, as shown in the drawing, and thus always available for immediate use.

As described above, in clearing map data, respective map data is kept in the map data storing means in a state according to their respective possibilities of being reused (compressed or not compressed). With this arrangement, actual delition of a delete object can be avoided, while sufficient vacancy can be ensured in the map data storing means. Therefore, in addition to the above (1), the need of reacquisition of map data is reduced, and map data clearance can be performed more preferably.

(3) Also preferably, the vehicle-use map data processing device may further comprise data volume judgment means for judging capacity shortfall in the map data storing means by comparing the total data volume of map data currently stored in the map data storing means and of map data planned to be acquired with a predetermined value. The compression means compresses the delete object based on the judgement made by the data volume judgement means.

In the above, when a judgement based on the data volume of map data planned to be acquired indicates shortage of vacant space, the delete object is compressed. Then, if the vacancy created by compression remains insufficient, the compressed delete object is then actually deleted. In this manner, map data clearance can be performed at an appropriate timing.

BRIEF DESCRIPTION OF THE DRAWINGS

The above and the other objects, features, and advantages of the present invention, will become further apparent from the following description of the preferred embodiment taken in conjunction with the accompanying drawings wherein.

DESCRIPTION OF THE PREFERRED EMBODIMENTS

In the following, a preferred embodiment of the present invention will be described with reference to the accompanying drawings. In this embodiment, the present invention is incorporated into a navigation system, which is one embodiment of a map data processing device 1.

Figure 1:
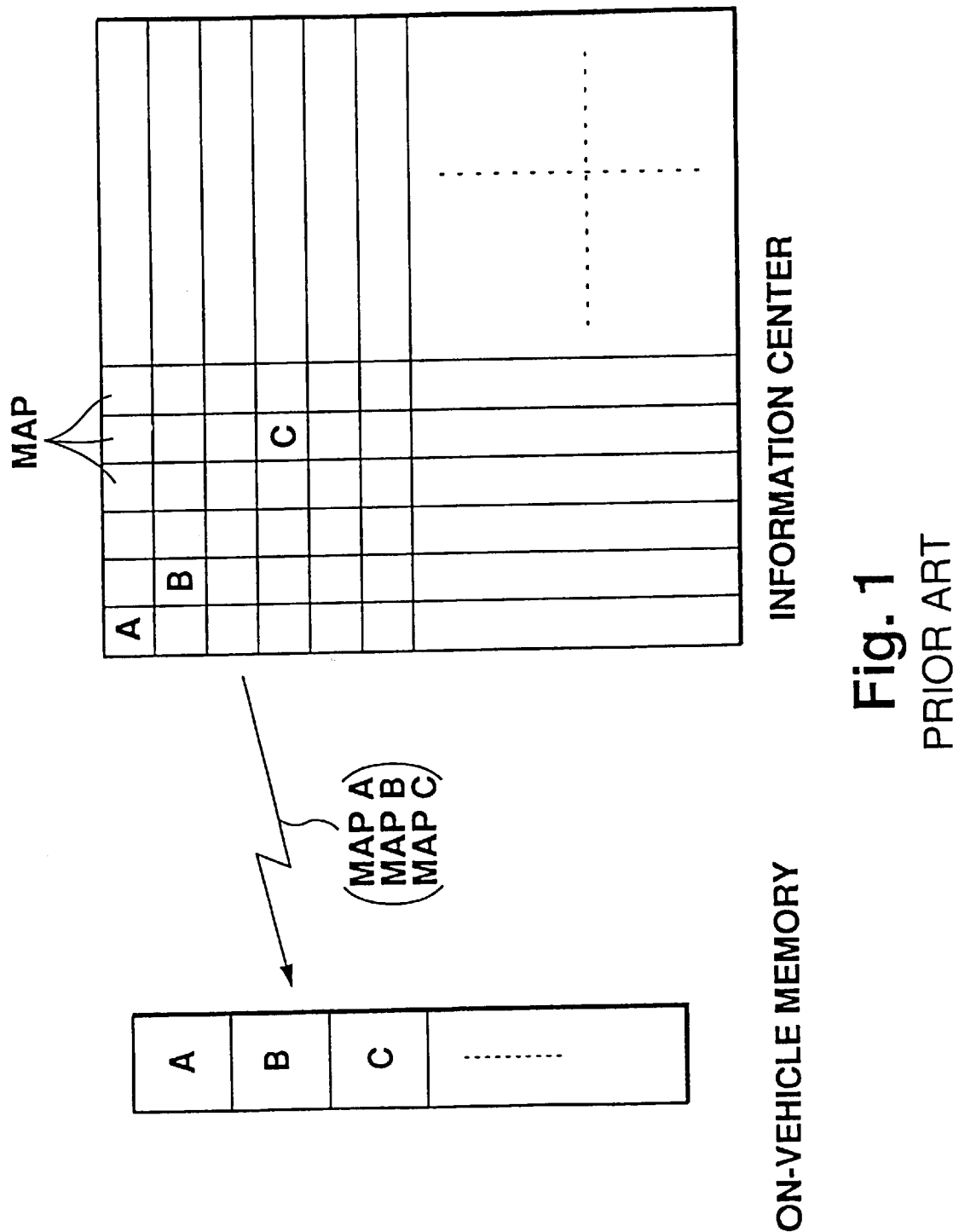
FIG. 1 is a schematic diagram showing a system which communicates map data to a vehicle.
Figure 2:
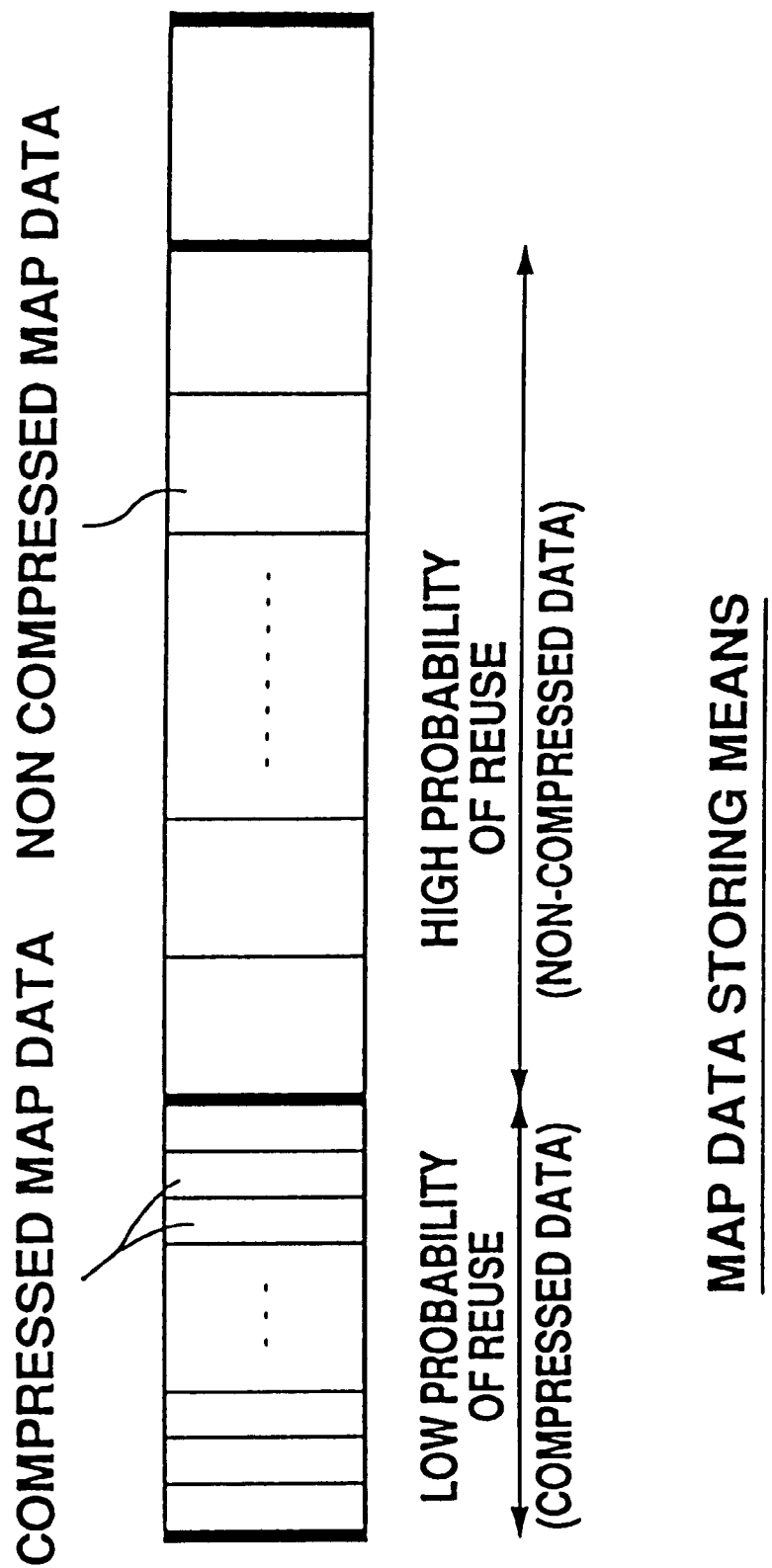
FIG. 2 is a diagram for explaining a map data clearing process using compression of this invention.
Figure 3:
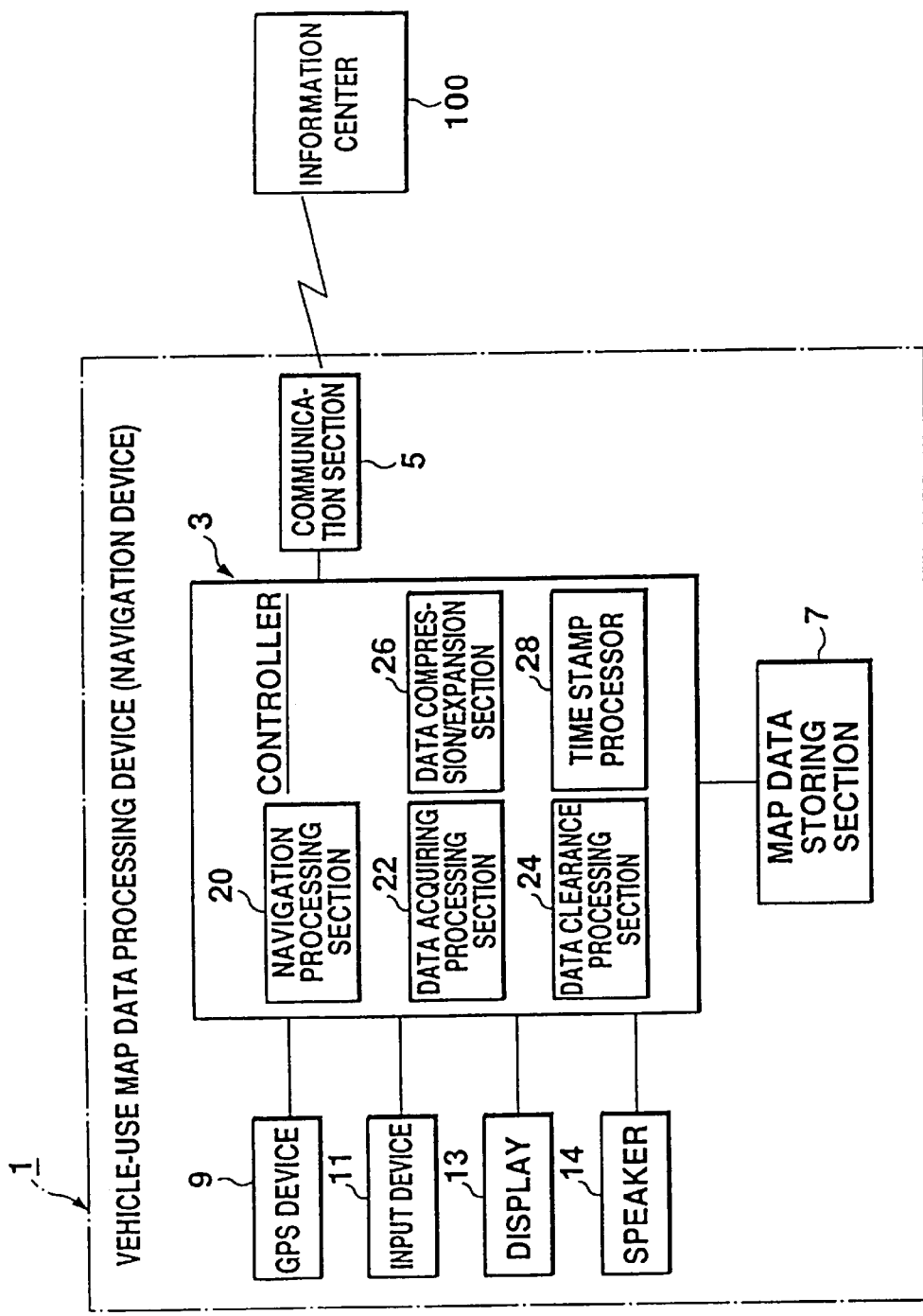
FIG. 3 is a block diagram showing a complete structure of a preferred embodiment of the present invention.

Referring to a complete structure of a vehicle-use map data processing device shown in FIG. 3, a vehicle-use map data processing device 1 has a controller 3 for comprehensive control over the device. The controller 3 is connected to a communication section 5, and carries out data communication with an information center 100, using the communication section 5. As was described referring to FIG. 1, the information center 100 has map data of detailed maps with a large coverage in divided forms (sectional map data). The controller 3 acquires, when necessary, desired sectional map data from the information center 100 through data communication.

The controller 3 is further connected to a map data storing section 7, such as a hard disk, DVD-RAM, or any other type of memory device, comprising a read/write memory medium. Map data acquired from the information center 100 is written into the map data storing section 7.

The controller 3 is still further connected to a GPS (Global Positioning System) device 9. A GPS device 9 is a device which locates a present position of a vehicle, using electric waves transmitted from a man-made satellite, and sends the positional information to the controller 3. The controller 3 includes a navigation processing section 20 which performs navigation, including route guidance, using current positional information and map data stored in the storage 7.

The controller 3 is also connected to an input device 11, a display 13, and a speaker 15. A user uses the input device 11 to input various instructions. For example, the user inputs a destination, using the input device 11. The input device 11 includes various switches and an audio recognizing device. A display 13 is an output means for displaying a screen image for navigation. A speaker 14 is also an output means for outputting audio guidance.

The controller 3 further has a data acquisition processing section 22 for acquiring sectional map data (hereinafter referred to simply as "map data" unless distinction is necessary) from the information center 100, using the communication section 5. The data acquisition processing section 22 detects whether or not the map data storing section 7 stores following map data (a) to (e), and acquires map data, if not stored, as well as other needed map data.

(a) map data on the present position
(b) map data on the areas in which the vehicle proceeds (for scrolling a display screen)
(c) map data on the destination for route guidance
(d) map data for use in setting a route to the destination
(e) map data on the areas designated by a user via the input device 11.

Figure 4:
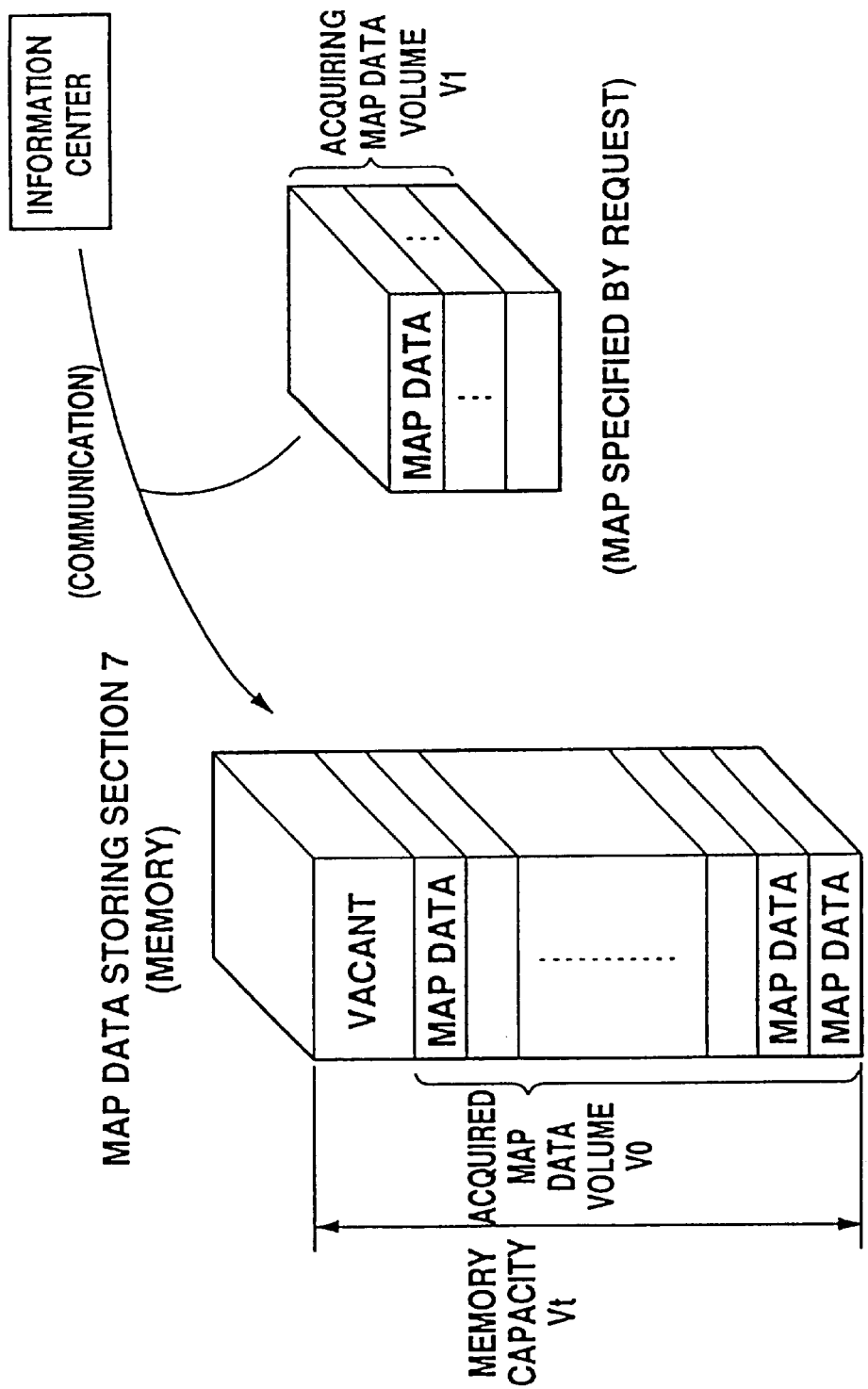
FIG. 4 is a diagram for explaining meanings of acquiring map data volume V1, current map data volume V0, and a memory capacity Vt.

The data acquisition processing section 22 sends a request specifying particular needed map data to the information center 100. In response to the request, the information center 100 informs, prior to data transmission, the requesting vehicle of the volume of the requested data, or "an acquiring map data volume V1." In the case that map data of a number of sectional maps is requested, "an acquiring map data volume V1" is the total volume thereof (see FIG. 4). The volume V1 is further informed to a data clearance processing section 24.

The data clearance processing section 24 keeps watch on an acquired map data volume V0. "An acquired map data volume V0" is the total volume of all map data already acquired from the information center 100 and stored in the map data storing section 7 (see FIG. 4). The volume of maximum map data which the storage 7 can store is defined as a memory capacity Vt. In the storage 7, some memory space is reserved for storing map data acquired from the center 100. The memory capacity Vt is set equal to or smaller than the capacity of the memory space in order to ensure sufficient room to store data.

Having informed of an acquiring map data volume V1 from the data acquisition processing section 22, the data clearance processing section 24 clears some of the map data stored in the storage 7 so that the total of acquiring and acquired map data volumes V0 and V1 does not exceed the memory capacity Vt.

In a data clearance process, map data with a lower probability of being used in the future is compressed or deleted. In particular, data compression is performed by a data compression/expansion section 26 according to instructions from a data clearance processing section 24. Data compression is performed using a known method such as JPEG or a structure run-length encoding method for compressing map drawing data, or a Hoffman encoding method for link data. Compressed map data is written into the map data storing section 7. When the navigation processor 20 needs to use compressed map data, the data compression/expansion section 26 expands compressed map data according to an instruction made by the navigation processor 20.

The controller 3 also has a time stamp processor 28 for adding information on an acquisition date and a last used date to map data. An acquisition date is the date when map data was acquired from the information center 100, while a last used date is the date when map data stored in the map data storing section 7 was most recently used. Those dates are written into the header portion of the map data.

The data clearance processing section 24 refers to the acquisition date and the last used date before clearing map data. Specifically, the data clearance processing section 24 chronologically rearranges map data before judging which map data is to be compressed or deleted. Note that, in reality, map data is not orderly stored in the map data storing section 7, and this map data rearrangement is made only hypothetically. Header portion is readable with even compressed map data.

Figure 5:
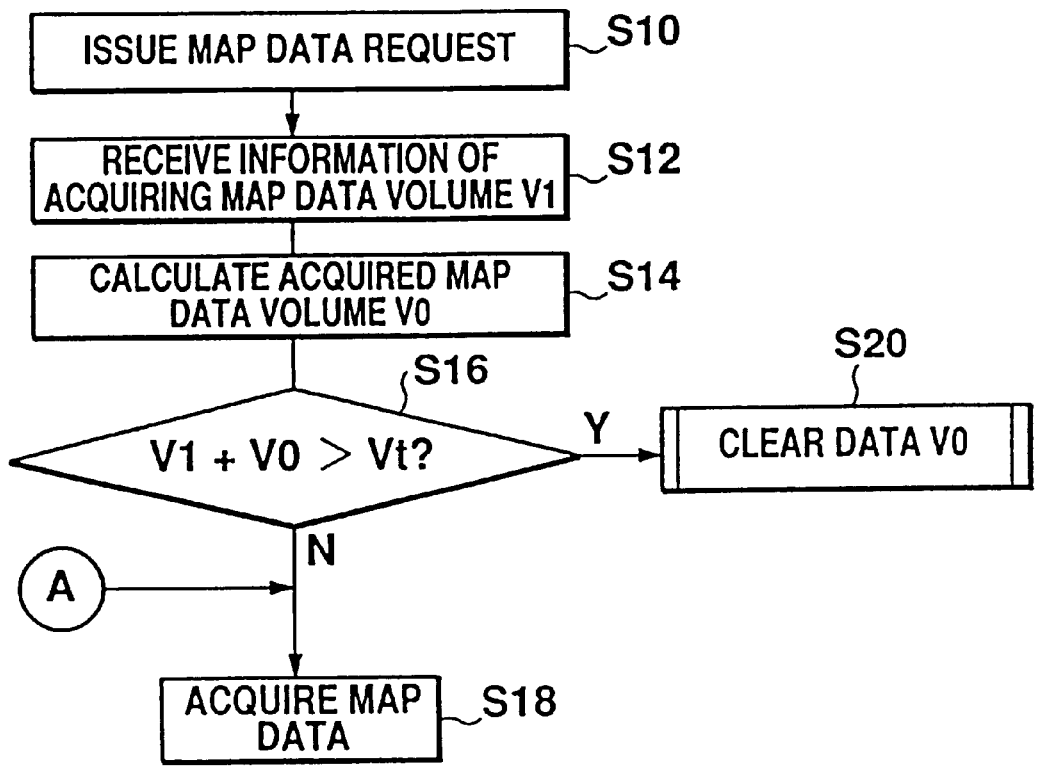
FIG. 5 is a flowchart of a map data acquiring process.
Figure 6:
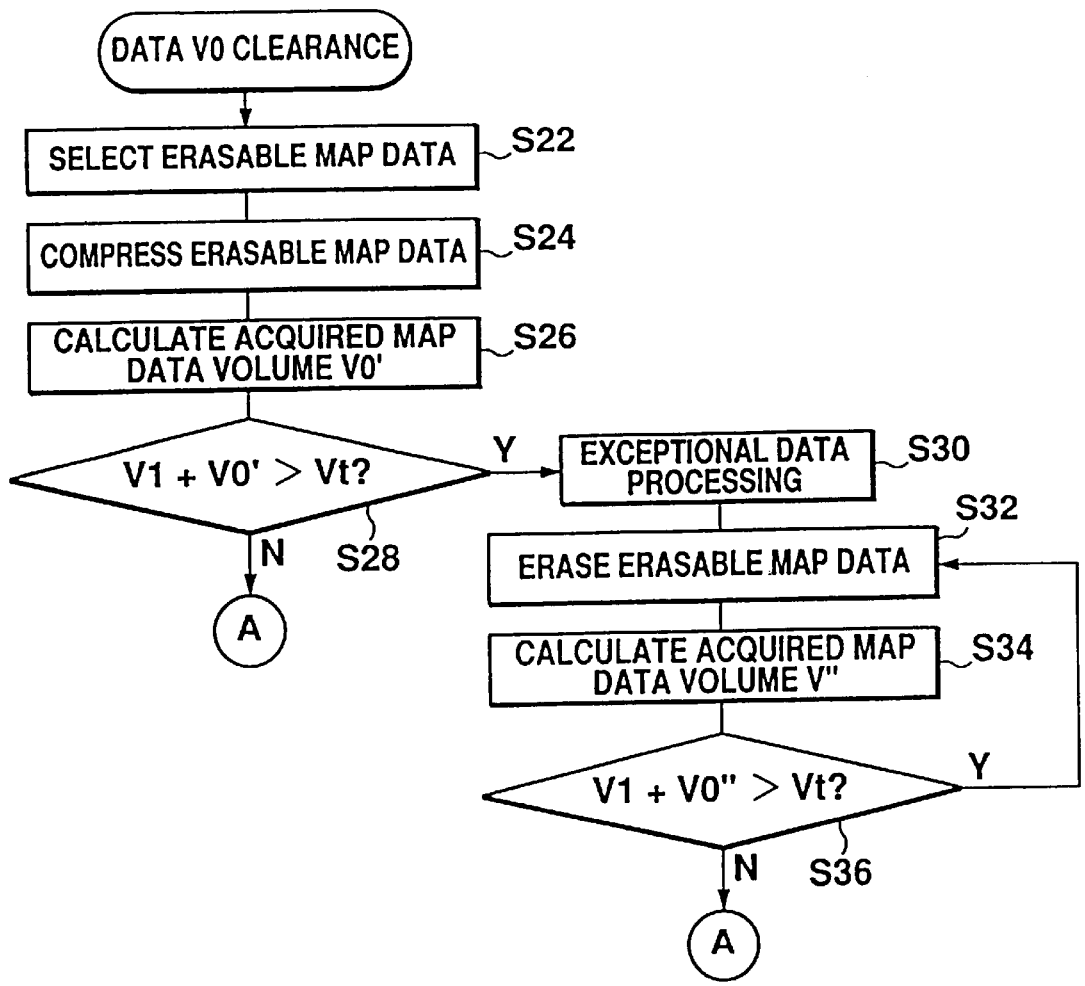
FIG. 6 is a flowchart of a map data clearing process.

In operation, referring to FIGS. 5 and 6, a map data clearance process is carried out, following a map data acquisition process. As described above, map data, such as those on the present position or the destination, must be acquired if they are not stored in the map data storing section 7. To acquire map data, the data acquisition processor 22 sends a request indicative of particular map data in need (S10). Such a request is transmitted via the communication section 5 to the information center 100, which in turn informs the requesting vehicle of the total volume of the requested map data, or the total acquiring map data volume V1. The acquiring map data volume V1 is known by the data clearance processing section 24 (S12). The processing section 24 obtains the total volume of map data currently stored in the map data storing section 7, or an acquired map data volume V0 (S14), and compares the sum of V1 and V0 with the memory capacity Vt (S16). If V1+V0 is equal or less than Vt, there is sufficient vacancy in the storage section 7 so that map data to be acquired can be stored therein. Then, the data acquiring processing section 22 actually acquires map data in need via data communication from the information center 100 (S18). The acquired map data is stored in the map data storing section 7 and kept ready for use by the navigation processing section 20. At the time of acquisition, the time stamp processor 28 attaches information of an acquisition date to the map data just acquired.

On the other hand, if a comparison shows that V1+V0>Vt at S16, it is known that a memory capacity of the map data storing section 7 is insufficient to store map data to be acquired, and the data clearance processing section 24 clears some of the map data currently stored in the map data storing section 7 (a data volume V0) prior to the acquisition of map data (S20).

Referring to the flowchart of a map data clearance process shown in FIG. 6, the data clearance processing section 24 selects map data to be deleted (a delete object) from among map data stored in the map data storing section 7 (S22). A delete object is map data which has a lower possibility of being used in the future.

Here, the more recent one of the acquisition date and the last used date is used as a map date. The data clearance processing section 24 rearranges map data stored in the map data storing section 7 chronologically according to the map dates. Respective map dates are compared with a predetermined date so that map data with an older than predetermined date is selected as a delete object. The basis of judgement, or the predetermined date, may be set at a date, for example, which is three months earlier than the present time.

The data clearance processing section 24 then instructs the data compression/expansion section 26 to compress a delete object. A delete object is retrieved from the map data storing section 7 and compressed before being returned to the map data storing section 7 (S24). As the volume of the map data stored in the map data storing section 7 is reduced with this process, the map data storing section 7 resultantly has an enlarged vacancy. After the process at S24, the data clearance processing section 24 calculates the volume of map data then stored in the map data storing section 7 (an acquired map data volume V0') (S26).

Similar to S16 of FIG. 5, the sum of the acquired map data volume V0' and the acquiring map data volume V1 is compared with the memory capacity Vt (S28). If V1+V0' is equal to or less than Vt, it is known that sufficient vacancy has been created in the map data storing section 7 through compression so that map data to be acquired can be stored therein, and the operating process returns to S18 of FIG. 5, where the data acquisition processing section 22 actually acquires map data via data communication from the information center 100.

On the other hand, if V1+V0' is larger than Vt at S28, it is known that sufficient capacity has not been ensured in the map data storing section 7 only through compression, and that some of the map data stored therein must therefore be deleted. However, before actual deletion, the data clearance processing section 24 carries out an exceptional data process (S30). That is, some of the map data is excluded from delete objects if a user wishes thus. Specifically, the following data is excluded:

(a) A user is entitled to register a specific point, using an input device 11. Map data concerning the registered point is excluded from delete objects. Moreover, map data concerning areas within a predetermined distance from the registered point, is also excluded;

(b) A user is entitled to attach a bookmark to the map data which he wishes not to be deleted. Map data with a bookmark is excluded from delete objects; and (c) A user is entitled to input his address, using an input device 11. Map data concerning areas within a predetermined distance from the user's address is excluded from delete objects. Note that a registered point or a user's address corresponds to a judgement standard position of this invention.

After the exceptional data process took place at S30, the data clearance processing section 24 actually deletes some of the map data stored in the map data storing section 7 (S32). In deleting map data, map data with the oldest map date is initially deleted. Then, the total volume of the remaining map data (an acquired map data volume V0") is calculated (S34), and the total of the acquired and acquiring map data volume V0" and V1 is compared with the memory capacity Vt (S36), similar to S16 and S28. If V1+V0" is larger than Vt, it is known that necessary vacancy has not yet ensured. Then, the operating process returns to S32, where map data with the then oldest map date is deleted.

In this manner, older map data is sequentially deleted until V1+V0" becomes equal to or less than Vt, or "No" at S36. When V1+V0" becomes equal to or less than Vt, it is known that sufficient vacancy has been ensured to store map data to be acquired. The operating process then returns to S18 of FIG. 5, and the data acquisition processing section 22 acquires necessary map data via data communication from the information center 100.

Figure 7:
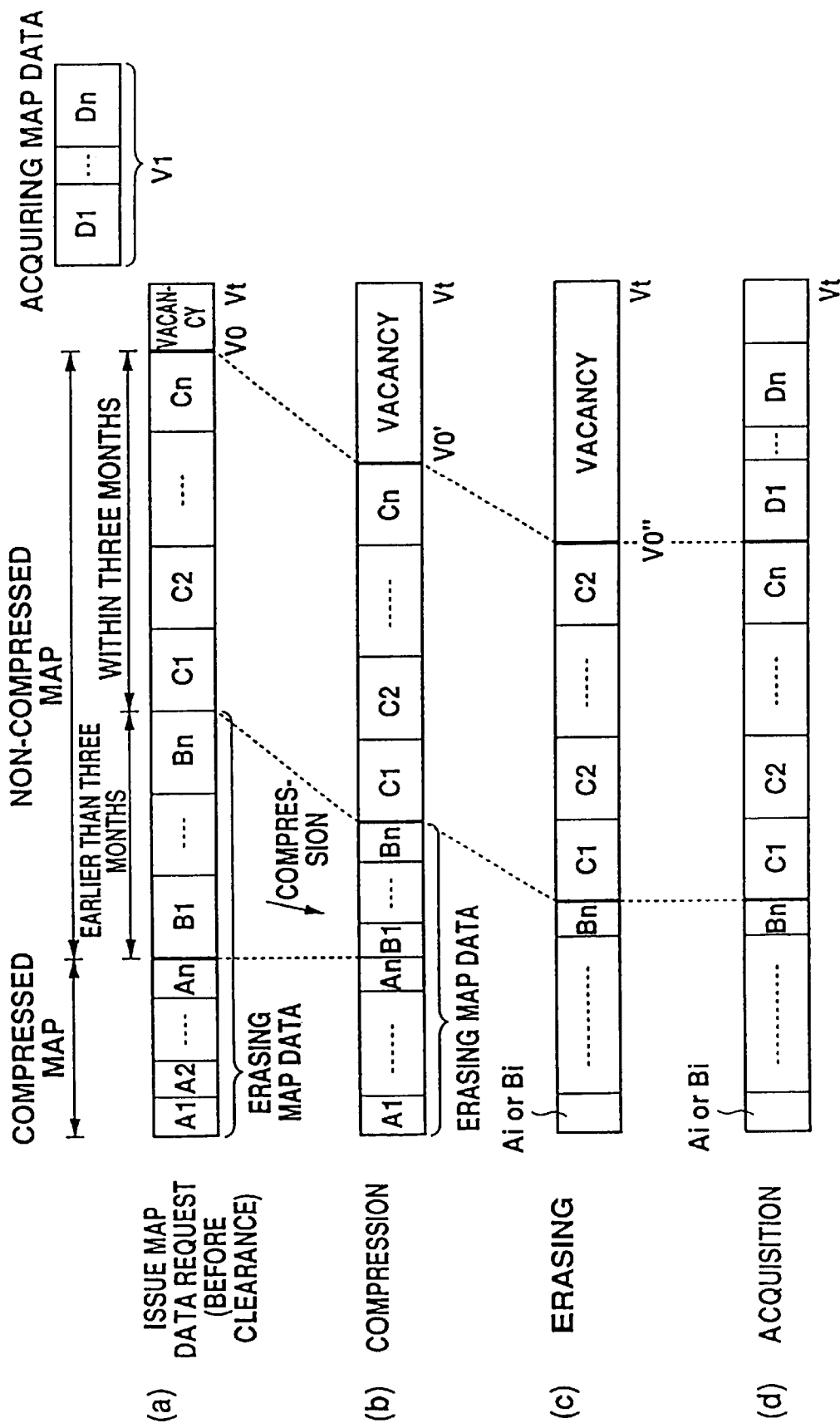
FIG. 7 is a diagram for explaining variation of a map data memory during a map data clearing process.

Referring to the internal state of the memory of the map data sorting section 7 shown in FIG. 7, a map data clearance process will be chronologically described. Note that although map data is arranged chronologically in FIG. 5, in actuality, they are arranged disorderly in the map data storing section 7. Similar to the above, the more recent one of the acquisition date and the last used date is used as a map date. Without a last used date, an acquisition date is used as a map date. Referring to FIG. 7(*a*) showing the state in which map data request was issued (before clearance), some of the map data (A1 to An) was compressed in the previous map data clearance process, while other map data (B1 to Bn, C1 to Cn) is stored as being not compressed. Here, the total volume of the stored map data (an acquired map data volume) is V0, while that of map data requested (an acquiring map data volume) is V1. Further, the volume of map data which a memory can store (a memory capacity) is Vt. If V0+V1 is equal to or less than Vt, the map data requested is written intact into the memory. However, if V0+V1 is larger than Vt, some of the map data must be cleared.

Referring to FIG. 7(*b*) showing the state in which a delete object was compressed at the first stage of a clearance process, map data (A1 to An) was selected as a delete object and compressed in the previous clearance process. Therefore, this map data (A1 to An) is selected here again as a delete object (no need of recompression). Map data (B1 to Bn), whose map date is earlier than three months from the present time, in other words, which has not been used recently, has a low possibility of being used again in the future, and, therefore, is selected as a delete object and compressed. Whereas, map data (C1 to Cn), whose map date is within three months from the present date, in other words, which has a higher possibility of being used again, is kept not compressed because if it is compressed, it will have to be decompressed each time it is used, which is inconvenient.

As is obvious from FIG. 7(*b*), vacant memory size has been enlarged through compression. Then, the then acquired map data volume V0' and the acquiring map data volume V1 is compared with the memory capacity Vt. If V0'+V1 is equal to or less than Vt, the map data to be acquired is actually acquired and written into the memory. However, with V0'+V1>Vt, as the available memory vacancy still runs short, some of the delete objects need to be deleted.

Referring to FIG. 7(*c*), some of the map data is excluded from delete objects in an exceptional data process, described above, and map data with older map dates is sequentially deleted from the memory. Deletion of map data is continued until vacancy becomes equal to or larger than the acquiring map data volume V1. If V0"+V1 is equal to or less than Vt, it is known that a sufficient vacancy has already been ensured in the memory. Then, as shown in FIG. 7(*d*), map data to be acquired is actually acquired and is written into the memory.

In the present embodiment, in which a vehicle-use map data processing device is particularly described, the data clearance processing section 24 serves as a selection means, a deleting means, and a data volume judgement means of this invention.

According to this embodiment, the possibility of reusing map data is estimated based on the map date of the map data. That is, map data with a recent map date is not compressed as it is estimated to have a higher possibility of being reused, so that this map data is always available for use by the navigation processing section 20. On the other hand, map data with an old map date is compressed to ensure enlarged vacancy as they are estimated to have a low possibility of being reused. Compressed map data can be used after decompression. If a sufficient vacancy is not ensured only through compression, older map data is sequentially deleted.

A possibility of reusing map data may also be judged, in an exceptional data process, based on the state of registered particular points in maps. That is, map data which a user wishes to maintain or which concern areas around the user's home, may have a higher possibility of being reused, and is thus excluded from delete objects.

As described above, map data is sequentially deleted in order of a lower possibility of being reused in this embodiment. With this arrangement, a wasteful operation of map data deletion and reacquisition of the same map data may be less conducted.

Also, expansion of vacancy is attempted through compression of a delete object before actually deleting the object. Map data is left in the map data storing section 7 in a state according to their possibilities of being reused (compressed or non-compressed). As a result, actual deletion of map data can be avoided as much as possible, and reacquisition of the same map data as the deleted ones may be less conducted.

(1) In the following, a modification of the above embodiment in scope of the present invention will be described. While sufficient vacancy is ensured through a map data clearance process before map data acquisition via data communication takes place in the above description, in this modification, map data is acquired prior to or at the same time of data clearance. Specifically, newly acquired map data is first stored in a memory (not shown). If sufficient vacancy has not been created in the storing section 7 by only compressing a delete object, the stored map data is written over older map data in the storing section 7, whereby a delete object is actually deleted at the time of overwriting.

(2) Another modification will be described. While a map data clearance process is carried out when acquiring map data in the above, in this modification, a map data clearance process is carried out also at the following timings (a) to (c) in this modification.

(a) at a predetermined clearance time;
(b) when the volume of stored map data mounts to a predetermined value (such as, 90% of the memory capacity);
(c) upon a user's instruction for map data clearance.

As no map data is acquired at the above timings, an acquiring map data volume V1 cannot be used in a clearance process. Then, a target volume of the map data which remain in the map data storing section 7 after a map data clearance process, is predetermined (such as, 80% of the memory capacity Vt), so that map data is compressed or deleted so as to achieve the target volume. The same process as that is shown in FIG. 6 will take place here for compression or deletion except that a target volume is used for the judgement at S28 and S36.

(3) A yet another modification will be described. While the acquisition date or the last used date of map data is used for estimation of the possibility of reusing map data in the above, in this modification, frequency of using map data is used for the estimation. Specifically, the history of past use is recorded in the header portion of map data stored in the map data storing section 7. Based on the history, the data clearance processing section 24 calculates the number of times when the map data has been used within a predetermined past time period. The number indicates the frequency of using map data. Map data with a lower frequency (for example, less than a predetermined time) is selected as a delete object.

Alternatively, a map date and a frequency of using map data may preferably be both used for estimation of the possibility of reusing the map data. For example, a map date may be referred to when roughly grouping the map data, as shown in FIG. 7, while a frequency of using map data may be referred to when making precise judgement as to the possibility of reusing the map data.

(4) Yet another modification will be described. While a delete object is both compressed and deleted for map data clearance in the above description, in this modification, a delete object is only deleted without being compressed. That is, the process at S24, S26, S28 of FIG. 6 is omitted. This modification also can achieve the advantage of the present invention, i.e., wasteful reacquisition of the same map data as those which were once deleted is avoided by deleting first map data with a lower possibility of being reused.

What is claimed is:

1. A vehicle-use map data processing device which utilizes map data acquired externally using communication means, comprising:
   map data storing means for storing the map data acquired;
   selection means for judging a possibility of reusing map data stored in the map data storing means to automatically select map data with a lower possibility of being reused as a delete object; and
   deleting means for deleting the delete object before deleting other map data from the map data storing means.

2. A vehicle-use map data processing device according to claim 1, further comprising compression means for compressing the delete object to thereby enlarge vacancy in the map data storing means, wherein the deleting means deletes the delete object when, after map data compression, the vacancy in the map data storing means is still judged to be insufficient.

3. A vehicle-use map data processing device according to claim 2, further comprising data volume judgement means for judging shortage of vacancy in the map data storing means through comparison of the total data volume of map data having been acquired and map data planned to be acquired with a predetermined value, wherein the compression means compresses the delete object based on the judgement made by the data volume judgement means.

4. A vehicle-use map data processing device according to claim 1, wherein the selection means judges a possibility of reusing map data based on at least one of an acquisition date or a last used date of the map data.

5. A vehicle-use map data processing device according to claim 1, wherein the selection means judges a possibility of reusing map data, based on positional relationship between a predetermined judgement standard point and an area corresponding to the map data.

6. A vehicle-use map data processing device according to claim 1, wherein the selection means judges a possibility of reusing map data based on frequency at which the map data have been used.

7. A vehicle-use map data processing device including map data acquiring means for externally acquiring map data using communication means, and map data storing means for storing the map data acquired, comprising:
   data volume judgement means for judging whether or not sufficient capacity remains in the map data storing means;
   selection means for selecting map data with a lower possibility of being reused as a delete object from map data stored in the map data storing means when the vacancy in the map data storing means runs short;
   compression means for compressing the delete object; and
   deleting means for deleting the delete object when the vacancy in the map data storing means still runs short after map data compression.

8. A vehicle-use map data processing device according to claim 7, wherein the data volume judgement means judges shortage of vacancy when the sum of the volume of map data currently stored in the map data storing means and the volume of map data planned to be acquired exceeds a predetermined value.

9. A vehicle-use map data processing device according to claim 8, wherein the volume of map data planned to be acquired is detected by sending a request indicative of the map data planned to be acquired to a map data provider outside, and receiving information of the volume provided by the map data provider.

10. A vehicle-use map data processing device according to claim 7, wherein the selection means judges a possibility of reusing map data, based on at least one of an acquisition date or last used date of the map date.

11. A vehicle-use map data processing device according to claim 7, wherein the selection means judges a low possibility of reusing map data when a map processing date is prior to a predetermined date, the map processing date being more recent one of an acquisition date or a last used date of the map data.

12. A vehicle-use map data processing device according to claim 11, wherein the deleting means continues deleting map data in the order of older map processing dates until the data volume judgement means judges that a required vacancy is ensured in the map data storing means.

13. A vehicle-use map data processing device according to claim 12, wherein the required vacancy is determined based on the volume of map data planned to be acquired next.

14. A vehicle-use map data processing device according to claim 12, wherein the map data acquiring means acquires map data from the external map data provider after it has been judged that the required capacity is available in the map data storing means.

15. A vehicle-use map data processing device according to claim 7, further comprising excluding processing means for excluding map data from delete objects, the map data having a predetermined positional relationship with respect to the predetermined judgement standard point.

16. A vehicle-use map data processing device according to claim 15, wherein the judgement standard point is a home of a user of the vehicle.

17. A vehicle-use map data processing device according to claim 15, wherein the judgement standard point is a particular position registered by the user.

18. A vehicle-use map data processing device according to claim 7, which is a navigation system for guiding a vehicle to a destination.

19. A vehicle-use map data processing device according to claim 18, wherein the map data acquiring means acquires map data of at least one of a map covering a present position, a map covering areas in which the vehicle proceeds, a map covering a destination of navigation, a map used for route guidance to the destination.

20. A map data processing method for automatically clearing map data acquired from outside a vehicle via data communication and stored in map data storing means, comprising steps of:

judging a possibility of reusing map data stored in the map data storing means to automatically select map data with a lower possibility of being reused as a delete object; and deleting the delete object prior to other map data from the map data storing means.

* * * * *